(12) United States Patent
Kim

(10) Patent No.: US 8,461,994 B2
(45) Date of Patent: Jun. 11, 2013

(54) RF RECEIVER AND RFID/USN SYSTEM HAVING THE SAME

(75) Inventor: Nam Yun Kim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 612 days.

(21) Appl. No.: 12/375,793

(22) PCT Filed: Sep. 18, 2007

(86) PCT No.: PCT/KR2007/004499
§ 371 (c)(1),
(2), (4) Date: Jan. 30, 2009

(87) PCT Pub. No.: WO2008/048005
PCT Pub. Date: Apr. 24, 2008

(65) Prior Publication Data
US 2009/0237251 A1    Sep. 24, 2009

(30) Foreign Application Priority Data
Oct. 19, 2006  (KR) .................. 10-2006-0102008

(51) Int. Cl.
G08B 13/14 (2006.01)
G08B 1/08 (2006.01)
H04Q 5/22 (2006.01)
H04B 1/40 (2006.01)
H04B 1/44 (2006.01)
H04B 7/00 (2006.01)
G06K 19/06 (2006.01)
G06K 7/10 (2006.01)
H04W 4/00 (2009.01)

(52) U.S. Cl.
USPC ... 340/572.1; 340/10.1; 340/10.5; 340/572.4; 340/539.1; 455/86; 455/78; 455/41.2; 235/492; 235/462.13; 370/338

(58) Field of Classification Search
USPC ............... 340/572.1, 10.1, 10.2, 10.3, 10.51, 340/10.6, 572.6, 572.7, 572.9, 825.69, 825.72, 340/573.1, 568.1, 541; 375/350, 340, 318, 375/323; 235/492, 375–385; 455/11.1, 41.1, 455/41.2, 41.3, 73, 127.4, 552.1, 553.1
See application file for complete search history.

(56) References Cited

U.S. PATENT DOCUMENTS 5,819,157 A * 10/1998 Ben-Efraim et al. ........... 725/68
6,148,048 A * 11/2000 Kerth et al. .................... 375/350

(Continued)

FOREIGN PATENT DOCUMENTS

CN    1307750 A    8/2001
CN    1797418 A    7/2006

(Continued)

OTHER PUBLICATIONS

First Office Action dated Dec. 13, 2011 in Chinese Application No. 200780031116.X, filed Sep. 18, 2007.

(Continued)

Primary Examiner — Jennifer Mehmood
Assistant Examiner — Mirza Alam
(74) Attorney, Agent, or Firm — Saliwanchik, Lloyd & Eisenschenk

(57) ABSTRACT

A radio frequency receiver comprises a first signal coupler coupling and branching a radio frequency signal received from a tag or a reader, a voltage regulator receiving the coupled signal and outputting a voltage-regulated signal having a predetermined level, a signal converter mixing the radio frequency signal transmitted from the first signal coupler by using the voltage-regulated signal as an oscillation frequency signal and generating a baseband frequency signal, a signal processor processing the baseband frequency signal and extracting tag information, and a data transceiver transmitting the tag information through a wire and/or wireless network.

17 Claims, 2 Drawing Sheets

U.S. PATENT DOCUMENTS

| | | | |
|---|---|---|---|
| 6,373,907 B1 | 4/2002 | Katsura et al. | |
| 7,023,341 B2 | 4/2006 | Stilp | |
| 7,044,387 B2* | 5/2006 | Becker et al. | 235/492 |
| 2003/0007473 A1* | 1/2003 | Strong et al. | 370/338 |
| 2003/0137446 A1* | 7/2003 | Vavik | 342/51 |
| 2005/0088299 A1 | 4/2005 | Bandy et al. | |
| 2005/0231367 A1* | 10/2005 | Bellantoni | 340/572.1 |
| 2006/0022801 A1* | 2/2006 | Husak et al. | 340/10.5 |
| 2006/0040621 A1* | 2/2006 | Rofougaran | 455/86 |
| 2006/0145855 A1* | 7/2006 | Diorio et al. | 340/572.1 |
| 2006/0186995 A1* | 8/2006 | Wu et al. | 340/10.1 |
| 2007/0069864 A1* | 3/2007 | Bae et al. | 340/10.2 |
| 2007/0206705 A1* | 9/2007 | Stewart | 375/316 |

FOREIGN PATENT DOCUMENTS

| | | |
|---|---|---|
| EP | 1033820 A1 | 9/1998 |
| EP | 1083668 A1 | 2/1999 |
| JP | 2005-350222 | 12/2005 |
| KR | 2005-0027100 | 3/2005 |
| WO | WO-2005-022454 | 3/2005 |
| WO | WO-2006/096029 A1 | 9/2006 |

OTHER PUBLICATIONS

European Search Report dated Aug. 10, 2011 in European Application No. 07808289.7, filed Sep. 18, 2007.
Office Action dated Aug. 1, 2012 in Chinese Application No. 200780031116.X, filed Sep. 18, 2007.

* cited by examiner

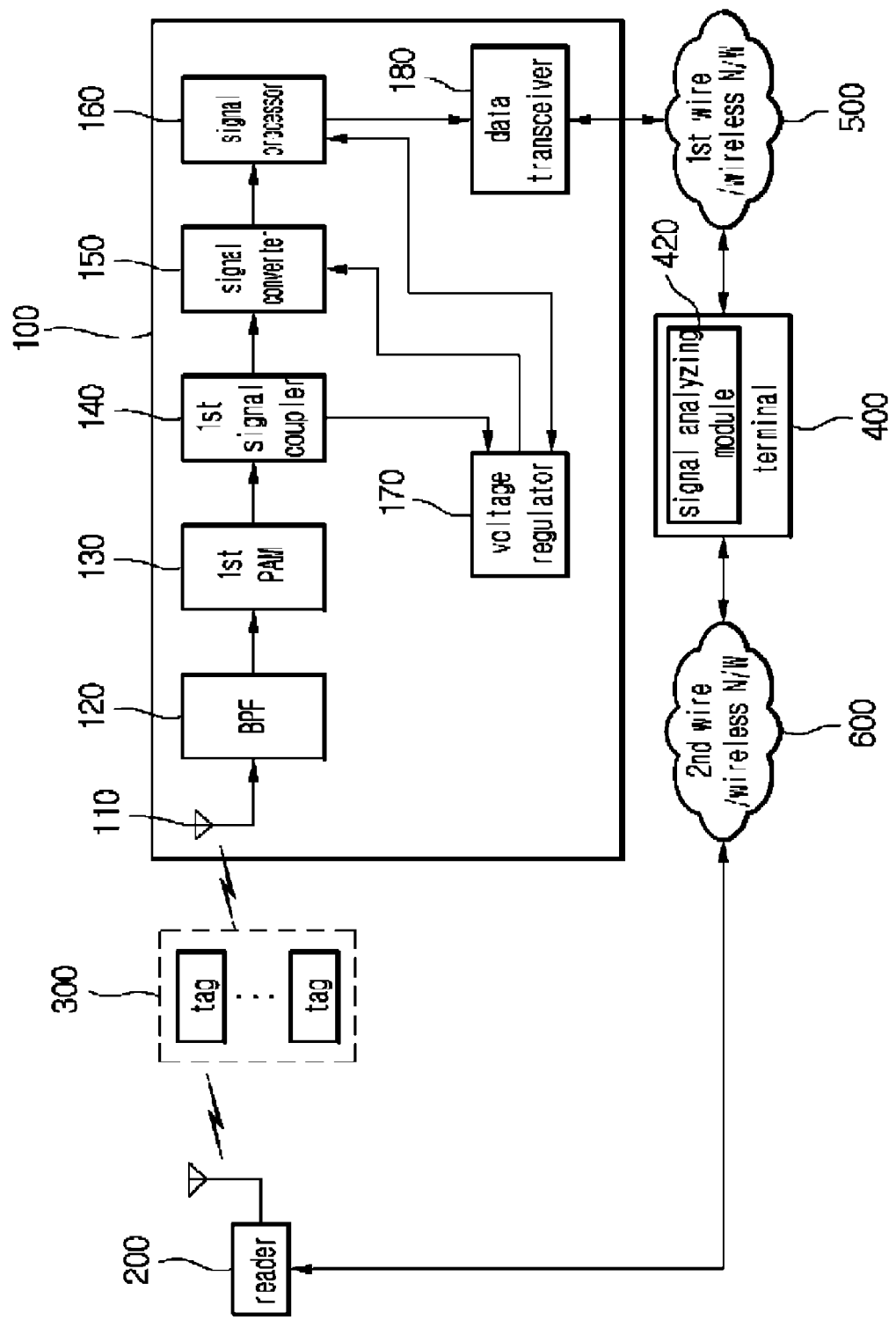
[Fig. 1]

[Fig. 2]
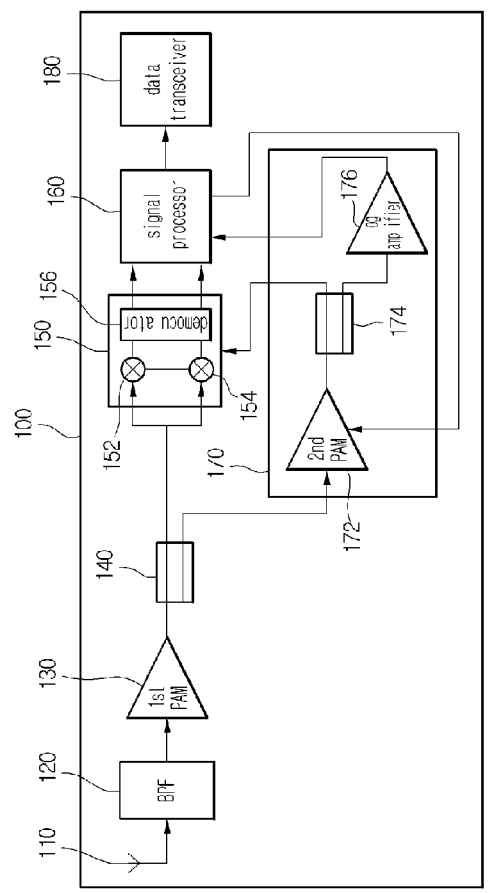
[Fig. 3]
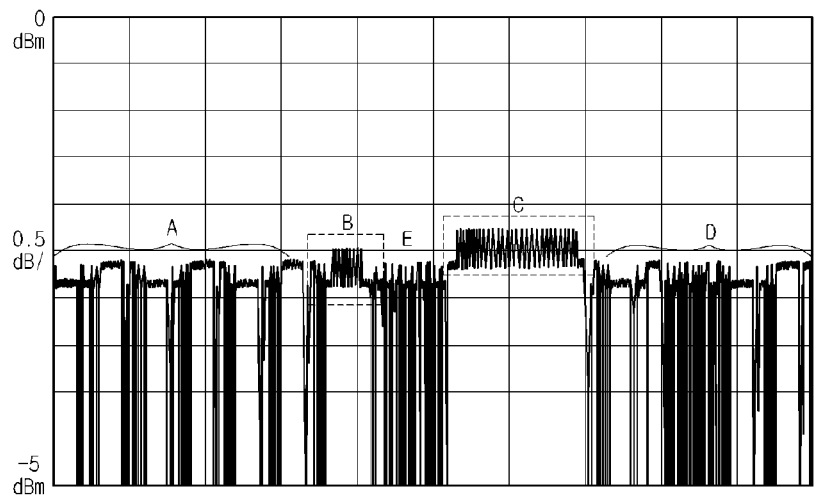
[Fig. 4]
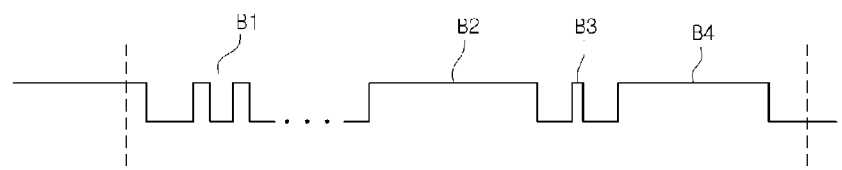

RF RECEIVER AND RFID/USN SYSTEM HAVING THE SAME

CROSS-REFERENCE TO RELATED APPLICATION

This application is the U.S. national stage application of International Patent Application No. PCT/KR2007/004499, filed Sep. 18, 2007, the disclosure of which is hereby incorporated by reference in its entirety.

TECHNICAL FIELD

The embodiment relates to a radio frequency identification/ubiquitous sensor network (RFID/USN) system.

BACKGROUND ART

A ubiquitous network technology has been captured the world's attention. The ubiquitous network technology allows a user to access various networks regardless of time and location. Such a ubiquitous network technology includes a radio frequency identification (RFID) technology or a ubiquitous sensor network (USN) technology, and a system employing these technologies is called an RFID/USN system.

The ubiquitous sensor network (USN) technology is referred to as a network technology of constructing a network such that plural pieces of information collected by various sensor are obtained in wireless. According to the USN technology, a plurality of sensor network nodes are installed in a region where the access of a person is difficult, thereby allowing the person to monitor the region.

An RFID system for commercial transaction includes an RFID tag attached to goods and equipped with detailed information about the goods and an RFID reader for reading the detailed information embedded in the RFID tag through RF communication. The RFID tag attached to the goods transmits the information to the RFID reader through RF communication while passing through an area where the RFID reader is positioned. Accordingly, there is provided an infrastructure capable of effectively processing supply chain management (SCM) including the distribution, the assembly, the price change, and the sale of goods.

When the RFID reader transmits an information requesting signal, the RFID tag transmits the tag information according to the signal. At this time, a signal transmitted from the RFID tag, which is located beyond the reading distance of the RFID reader, may not arrive at the RFID reader, but leaked.

In the RFID/USN system, if the signal provided from the RFID tag is leaked, the RFID reader cannot generate exact information about physical distribution. Thus, the RFID/USN system must be provided with more many RFID readers in order to solve the above problem. However, if the number of the RFID readers increases, radio interference is strongly caused between the RF readers, so that a tag recognition rate and a tag recognition distance may be reduced. In addition, the complex network may be required.

DISCLOSURE OF INVENTION

Technical Problem

The embodiment provides an RF receiver and an RFID/USN system having the same, capable of effectively improving a tag recognition rate.

Technical Solution

The embodiment provides a radio frequency receiver comprising a first signal coupler coupling and branching a radio frequency signal received from a tag or a reader, a voltage regulator receiving the coupled signal and outputting a voltage-regulated signal having a predetermined level, a signal converter mixing the radio frequency signal transmitted from the first signal coupler by using the voltage-regulated signal as an oscillation frequency signal and generating a baseband frequency signal, a signal processor processing the baseband frequency signal and extracting tag information, and a data transceiver transmitting the tag information through a wire and/or wireless network. The embodiment provides a radio frequency identification/ubiquitous sensor network comprising a reader for transmitting an information requesting signal to request providing of tag information and receiving the tag information from a tag corresponding to the information requesting signal, a radio frequency receiver for receiving the tag information from the tag, a terminal for receiving the tag information from the radio frequency receiver, a first network for connecting the radio frequency receiver with the terminal, and a second network for connecting the reader with the terminal.

Advantageous Effects

According to the embodiment, a tag recognition rate can be effectively improved.

According to the embodiment, a tag recognition distance can be lengthened, and the application area of an RFID/USN system can be expanded.

BRIEF DESCRIPTION OF THE DRAWINGS

FIG. 1 is a view for explaining an RF receiver according to the embodiment;

FIG. 2 is a view showing an RF receiver according to the embodiment; and

FIGS. 3 and 4 are graphs for explaining the standard of a transmission/reception signal of an RF receiver according to the embodiment.

MODE FOR THE INVENTION

Hereinafter, the embodiment will be described with reference to accompanying drawings.

An RF receiver according to the embodiment is adaptable for an RFID/USN system. The RF receiver cooperates with a reader to receive and complementarily process a tag signal, which has been not recognized in a cell area of the reader.

FIG. 1 is a view for explaining an RF receiver 100 according to the embodiment.

The RF receiver 100 can make communication with a reader 200 and a tag 300. The RF receiver 100 may be connected to a terminal 400 positioned in an external place through a first wire/wireless network 500. The terminal 400 can be connected to the reader 200 through a second wire/wireless network 600.

The tag 300 is attached to an article such that tag information including article information can be transmitted. The reader 200 may be installed in the movement area of the article such as a gate area of a conveyer system or a vehicle. The reader 200 can transmit a signal of requesting the providing of information to the tag 300, and receive and process tag information transmitted from the tag 300.

At this time, the tag information transmitted from the tag 300 may be leaked without being received in the reader 200. For example, when an article having the tag 300 attached thereto is conveyed, a signal transmitted from the tag 300, which is positioned beyond the reading distance of the reader 200, may not arrive at the reader 200.

The RF receiver 100 according to the embodiment receives the leaked signal to provide tag information to one of the terminal 400 and the reader 200, thereby improving the recognition rate of the tag 300 and enlarging the recognition distance and the recognition area of one reader.

The terminal 400 can receive the tag information from the RF receiver 100 to deliver the tag information to the reader 200. The terminal 400 may be a system equipped with an integrated management program to receive and process the tag information from the reader 200 and the RF receiver 100.

For example, the terminal 400 can extract article information to statistically process information about time in which the tag 300 is recognized (e.g., information about time in which the article having the tag 300 attached thereto passes through a predetermined area) and information about an amount of articles.

As shown in FIG. 1, the reader 200 and the RF receiver 100 can simultaneously detect the signal transmitted from the tag 300. Accordingly, the monitoring area for the tag 300 is enlarged, and a transmission distance of the tag 300 is prolonged.

Although the RF receiver 100, the reader 200, the terminal 400 may be provided at least one respectively according to install environments, the embodiment will be explained regarding the system comprising one RF receiver 100, one reader 200 and one terminal 400.

The first wire/wireless network 500 and the second wire/wireless network 600 may be independently selected from among wireless network such as the Wi-Fi, the ultra wide band (UWB), the Bluetooth, the world interoperability for microwave access (WiMax), the zigbee, and the dedicated short range communication (DSRC). In addition, the first wire/wireless network 500 and the second wire/wireless network 600 may be independently selected from among wire networks such as the universal asynchronous receiver/transmitter (UART), the RS-232, the RS-485, the Internet protocol (TCP/IP), a switch hub, and a serial/parallel cable.

As shown in FIG. 1, the RF receiver 100 comprises an antenna 110, a band pass filter (BPF) 120, a first power amplifier module (PAM) 130, a first signal coupler 140, a signal converter 150, a signal processor 160, a voltage regulator 170, and a data transceiver 180.

The antenna 110 receives an RF signal from the tag 300 or the reader 200. The antenna 110 may be selected from among a dipole antenna, a monopole antenna, a micro-strip antenna, and a patch antenna.

The band pass filter 120 passes a frequency signal in a band allocated to an RFID communication channel and suppresses a signal having an adjacent component or a noise component.

The RF receiver 100 comprises the minimum circuits required for processing the leaked signal of the tag 300, which is not received in the reader 200. The RF receiver 100 uses the received radio frequency signal as an oscillating frequency signal to generate a baseband signal. The RF receiver 100 may not have an additional phase locking loop circuit.

The RF receiver 100 generates tag information when a signal is received therein from the tag 300. The RF receiver 100 can provide corresponding tag information when a signal of requesting leaked tag information is received from the reader 200 or the terminal 400.

A radio frequency signal received in the antenna 110 is delivered to the signal converter 150 through the first signal coupler 140. A radio frequency signal branching to the voltage regulator 170 from the first signal coupler 140 is adjusted into an oscillating frequency signal while passing through the voltage regulator 170 so that the oscillating frequency signal can be delivered to the signal converter 150.

The signal converter 150 mixes the radio frequency signal delivered from the first signal coupler 140 and the oscillating frequency signal delivered through the voltage regulator 170 so as to generate a baseband signal.

The first PAM 130 amplifies the radio frequency signal delivered from the band pass filter 120 to a signal having a voltage level sufficient to be subject to a coupling operation, thereby delivering the signal to the first signal coupler 140.

The first signal coupler 140 performs a coupling operation with respect to the radio frequency signal which is delivered toward the signal converter 150 from the first PAM 130, thereby delivering a coupled signal to the voltage regulator 170. The voltage regulator 170 regulates a voltage level of the coupled signal to a predetermined level to deliver the coupled signal to the signal converter 150.

The signal converter 150 mixes baseband signal. The baseband signal is delivered to the signal processor 160. The signal processor 160 processes the baseband signal and analyze tag information. In this case, the signal processor 160 comprises a storage unit and can store the tag information in the storage unit. The signal processor 160 can extract the tag information and transmit the tag information through the data transceiver 180 when the terminal 400 requests data. In addition, an RFID/USN system may be designed such that all tag information extracted by the signal processor 160 is transmitted to the terminal 400.

For example, in order to analyze tag information, the signal processor 160 can receive reader information from the reader 200 and then analyze the received tag information based on the reader information. The reader information comprises an information requesting signal and synchronization information matching with an RFID standard.

Accordingly, the signal processor 160 can analyze the tag information in synchronization with the RFID standard (reader information), and can match a voltage level with a reader signal.

The data transceiver 180 may be connected to the terminal 400 through the first wire/wireless network 500. The terminal 400 can receive tag information from the data transceiver 180 to perform statistical and accounting operations, together with tag information transmitted from the reader 200 through the second wire/wireless network 600.

Accordingly, the RFID/USN system employing the RF receiver 100 can prevent the occurrence of a tag which is not detected among the moving tags 300.

Hereinafter, the RF receiver 100 will be described in detail with reference to FIG. 2. In this case, the same reference numerals will be assigned to the elements identical to the elements shown in FIG. 1 and detailed description thereof will be omitted in order to avoid redundancy.

The RF receiver 100 according to the embodiment comprises the antenna 110, the band pass filter 120, the first PAM 130, the first signal coupler 140, the signal converter 150, the signal processor 160, the voltage regulator 170, and the data transceiver 180.

The signal converter 150 comprises a first mixer 152, a second mixer 154, and a demodulator 156. In addition, the voltage regulator 170 comprises a second PAM 172, a second signal coupler 174, and a log amplifier 176.

The first signal coupler 140 is connected between the first PAM 130 and the signal converter 150 to perform a coupling operation with respect to a radio frequency signal toward the signal converter 150 from the first PAM 130, thereby transmitting the radio frequency signal to the voltage regulator 170. The first and second signal couplers 140 and 174 may be realized by using a coupling capacitor, or a directional coupler.

For example, when the coupling capacitor is used, the signal couplers comprise a dielectric structure having a predetermined dielectric constant, so that the radio frequency signal on the transmission path is coupled without signal loss.

In addition, when the directional coupler is used, a wave guide having four ports may be employed. An input port and a through-pass port are connected to the first PAM 130 and the signal converter 150, respectively, and an output port may be connected to the voltage regulator 170 through a capacitor (which blocks a DC component signal from flowing toward the signal converter 150). A remaining port is an isolation port, and may be connected to a ground terminal through a resistor.

The coupled radio frequency signal is delivered to the second PAM 172 of the voltage regulator 170, and the second PAM 172 gain-amplifies the radio frequency signal to stabilize the level of the radio frequency signal into a predetermined voltage level.

The stabilized signal is transmitted to the signal converter 150 such that the signal can be used as an oscillation frequency signal. Accordingly, according to the embodiment, a high-priced and complex phase locking loop circuit is not additionally required.

In this case, the second signal coupler 174 is connected between the second PAM 172 and the signal converter 150. The second signal coupler 174 performs a coupling operation with respect to the output signal of the second PAM 172 such that the output signal is delivered to the log amplifier 176.

The second signal coupler 174 may be realized by using a coupling capacitor, or a directional coupler similarly to the first signal coupler 140.

The log amplifier 176 outputs an analog-state signal into a DC voltage signal such that the signal processor 160 can be detected a voltage level. In this case, the coupled radio frequency signal is output in the form of the DC voltage signal proportional to a decibel value, thereby expanding a sensitivity range of a signal having a receptible power level.

The DC voltage signal generated from the log amplifier 176 is transmitted to the signal processor 160, and the signal processor 160 compares the level of the DC voltage signal with a preset level of a reference voltage to generate a gain control signal.

In this case, the level of the reference voltage is a changeable numeric value, and signal analysis is possible when the intensity of a signal received from the reader 200 is correspondent to the intensity of a signal received from the tag 300. Accordingly, the level of the reference voltage is adjusted according to the intensity of the signal received from the reader 200.

The signal processor 160 delivers the gain control signal to the second PAM 172, and the second PAM 172 can amplify a radio frequency signal to a stabilized oscillation frequency signal by the gain control signal.

Meanwhile, the oscillation frequency signal amplified in the second PAM 172 is supplied to the first mixer 152 and the second mixer 154 of the signal converter 150. The first mixer 152 and the second mixer 154 mixes the oscillation frequency signal input from the second PAM 172 and the radio frequency signal input through the first signal coupler 140 to generate baseband frequency signals, which comprise an In phase (I) signal and a Quadrature phase (Q) signal.

The baseband frequency signals generated through the first and second mixers 152 and 154 are demodulated by the demodulator 156. The demodulated signals in the demodulator 156 are delivered to the signal processor 160.

The signal processor 160 may be realized by using a field programmable gate array circuit (FPGA), or a digital signal processing (DSP) circuit, and may include an analog/digital (AD) converter.

The AD converter converts a signal transmitted from the demodulator 156, or the log amplifier 176 into a digital signal which can be processed in a main operating circuit.

The AD converter may be realized by using a comparator having a positive feedback structure to minimize a signal to noise ratio (SNR). In addition, the AD converter may be designed by using an OP amplifier having a positive feedback structure for a hysteresis phenomenon in order to sufficiently reduce influence of noise exerted upon the main operating circuit.

In addition, the signal processor 160 includes a kernel to provide an interface with components including the data transceiver 180, process an interrupt operation, and allocate a request processing time and an operation priority to the components such that the components sequentially operate. The signal processor 160 manages the address of the storage unit so that the input/output of data can be controlled.

As described above, the signal transmitted from the tag 300 corresponds to the information requesting signal, which has been initially requested by the reader 200, and mist conform to RFID standards. Accordingly, the signal processor 160 analyzes the standard of the signal, which has been received from the reader 200, thereby creating tag information.

FIGS. 3 and 4 are graphs schematically showing the standard of a transmitted/received signal used in the RF receiver 100 according to the embodiment.

As shown in FIG. 3, reference characters A and E represent sections in which the reader 200 monitors whether or not the tag 300 enters a communication area, and reference character B represents a section in which the reader 200 transmits an information requesting signal.

In addition, reference character C denotes a section in which the tag 300 transmits a response signal according to the information requesting signal, and reference character D represents a section in which the tag information is transmitted after the response signal has been transmitted.

FIG. 4 is an enlarged view showing the section B of FIG. 3. As shown in FIG. 4, reference character B1 represents a section in which a preamble signal is transmitted, reference character B2 represents a section in which an information data signal is transmitted, and reference character B3 represents a section in which a transmission termination signal is transmitted. In addition, reference character B4 denotes a section in which a signal for energy supply is transmitted from the reader 200 in order to supply power to the tag 300.

Accordingly, the signal processor 160 analyzes the signal received from the reader 200 to perform a synchronization function with respect to data timing in match with signal standards described with reference to FIGS. 3 and 4. For example, the tag information is synchronized in match with the signal standard of the section D.

If contents requesting leaked tag information exist as the analysis result of the signal received from the reader 200, the signal processor 160 extracts corresponding tag information and delivers the tag information to the data transceiver 180.

The structure of the data transceiver 180 may be changed according to the realization scheme of the first wire/wireless network 500. If the first wire/wireless network 500 is realized through a universal asynchronous receiver/transmitter (UART) scheme, the data transceiver 180 may be a kind of a UART connection device.

The data transceiver 180 can transmit the tag information to the terminal 400 through the first wire/wireless network 500. For example, the second wire/wireless network 600 may be realized through the UART scheme.

A signal analyzing module 420 of the terminal 400 includes a program (middleware) to collect and statistically process tag information on a medium access control (MAC) layer and an application program layer. The terminal 400 can be connected to the reader 200 through the second wire/wireless network 600. The signal analyzing module 420 may receive the tag information from the reader 200 through the second wire/wireless network 600.

The terminal 400 can receive tag information from the RF receiver 100 as well as the reader 200. The terminal 400 compares tag information from the reader 200 with tag information from the RF receiver 100, thereby determining whether or not tag information, which is not obtained in the reader 200, exits.

In an RFID/USN system according to the embodiment, tag information is received from the reader 200 and the RF receiver 100, thereby preventing tag information from being missed. Accordingly, in the RFID/USN system according to the embodiment, a tag recognition rate can be effectively improved.

Any reference in this specification to "one embodiment", "an embodiment", "example embodiment" etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the embodiment, a tag recognition rate can be effectively improved.

According to the embodiment, a recognition distance of a tag can be extended, and an application area of the RFID/USN system can be expanded.

The invention claimed is:

1. A radio frequency receiver comprising:
a first signal coupler coupling and branching a radio frequency signal received from a reader;
a voltage regulator receiving the coupled signal and outputting a voltage regulated signal having a predetermined level;
a signal converter mixing the radio frequency signal transmitted from the first signal coupler by using the voltage-regulated signal as an oscillation frequency signal, and generating a baseband frequency signal;
a signal processor processing the baseband frequency signal and extracting tag information; and
a data transceiver transmitting the tag information through a wire and/or wireless network;
wherein the signal processor processes a signal received from the reader to generate reader information, and analyzes synchronization information comprising the reader information,
wherein, if contents requesting leaked tag information exist as an analysis result of the synchronization information, the signal processor extracts the leaked tag information from a signal received from a tag by using the synchronization information, and
wherein the signal received from the reader comprises:
a first section and a fifth section, wherein the reader monitors in the first section and the fifth section whether or not the tag enters a communication area;
a second section in which the reader transmits an information requesting signal;
a third section in which the tag transmits a response signal according to the information requesting signal; and
a fourth section in which the tag information is transmitted after the response signal has been transmitted.

2. The radio frequency receiver as claimed in claim 1, wherein the voltage regulator comprises: an amplifier for gain-amplifying the coupled signal; and a second signal coupler connected to an output terminal of the amplifier to perform a coupling operation with respect to an amplified signal; and,
wherein the signal processor receives a coupled signal from the second signal coupler to determine the intensity of the coupled signal, generates a gain control signal and transmits the gain control signal to the amplifier.

3. The radio frequency receiver as claimed in claim 2, wherein the voltage regulator comprises a log amplifier, which converts a signal coupled by the second signal coupler into a DC signal having a predetermined level and transmits the DC signal to the signal processor.

4. The radio frequency receiver as claimed in claim 1, wherein the signal converter comprises at least one mixer.

5. The radio frequency receiver as claimed in claim 1, wherein the signal converter mixes the radio frequency signal with the voltage-regulated signal to generate a baseband frequency signal having an In phase (I) signal and a Quadrature phase (Q) signal.

6. The radio frequency receiver as claimed in claim 1, comprising:
an antenna for receiving a radio frequency signal from the tag or the reader; and
a filter disposed between the antenna and the first signal coupler.

7. The radio frequency receiver as claimed in claim 6, comprising a first amplifier disposed between the antenna and the first signal coupler.

8. The radio frequency receiver as claimed in claim 1, wherein the signal processor comprises an analog to digital converter (ADC).

9. The radio frequency receiver as claimed in claim 1, wherein the signal converter comprises a demodulator which demodulates the received radio frequency signal.

10. A radio frequency identification/ubiquitous sensor network comprising:

a reader for transmitting an information requesting signal to request providing of tag information, and receiving the tag information from a tag corresponding to the information requesting signal;

a radio frequency receiver for receiving the tag information from the tag;

a terminal for receiving the tag information from the radio frequency receiver;

a first network for connecting the radio frequency receiver with the terminal; and a second network for connecting the reader with the terminal, wherein the receiving frequency receiver includes:
- a first signal coupler coupling and branching a radio frequency signal received from the reader;
- a voltage regulator receiving the coupled signal and outputting a voltage regulated signal having a predetermined level;
- a signal converter mixing the radio frequency signal transmitted from the first signal coupler by using the voltage-regulated signal as an oscillation frequency signal, and generating a baseband frequency signal;
- a signal processor processing the baseband frequency signal and extracting tag information; and
- a data transceiver transmitting the tag information through a wire and/or wireless network, wherein the signal processor processes a signal received from the reader to generate reader information, and analyzes synchronization information comprising the reader information, wherein, if contents requesting leaked tag information exist as an analysis result of the synchronization information, the signal processor extracts the leaked tag information from a signal received from the tag by using the synchronization information, and wherein the signal received from the reader comprises:
- a first section and a fifth section, wherein the reader monitors in the first section and the fifth section whether or not the tag enters a communication area;
- a second section in which the reader transmits an information requesting signal;
- a third section in which the tag transmits a response signal according to the information requesting signal; and
- a fourth section in which the tag information is transmitted after the response signal has been transmitted.

11. The radio frequency identification/ubiquitous sensor network as claimed in claim 10, wherein the voltage regulator comprises:
an amplifier for gain-amplifying the coupled signal; and a second signal coupler connected to an output terminal of the amplifier to perform a coupling operation with respect to an amplified signal; and
wherein the signal processor receives a coupled signal from the second signal coupler to determine the intensity of the coupled signal, generates a gain control signal and transmits the gain control signal to the amplifier.

12. The radio frequency identification/ubiquitous sensor network as claimed in claim 11, wherein the voltage regulator comprises a log amplifier, which converts a signal coupled by the second signal coupler into a DC signal having a predetermined level and transmits the DC signal to the signal processor.

13. The radio frequency identification/ubiquitous sensor network as claimed in claim 10, wherein the signal converter comprises at least one mixer.

14. The radio frequency identification/ubiquitous sensor network as claimed in claim 10, wherein the signal converter mixes the radio frequency signal with the voltage-regulated signal to generate a baseband frequency signal having an In phase (I) signal and a Quadrature phase (Q) signal.

15. The radio frequency identification/ubiquitous sensor network as claimed in claim 10, comprising:
an antenna for receiving a radio frequency signal from the tag or the reader; and
a filter disposed between the antenna and the first signal coupler.

16. The radio frequency identification/ubiquitous sensor network as claimed in claim 10, wherein the terminal compares tag information provided from the reader with tag information provided from the radio frequency receiver, thereby determining whether or not tag information, which is not obtained from the reader, exists.

17. The radio frequency identification/ubiquitous sensor network as claimed in claim 10, wherein the first network and the second network are at least one of a wire network and a wireless network.

* * * * *